Patented Feb. 22, 1949

2,462,422

UNITED STATES PATENT OFFICE 2,462,422

PROCESS FOR POLYMERIZING VINYL HALIDES

Louis Plambeck, Jr., Wilmington, Del., assignor to E. I. du Pont de Nemours & Company, Wilmington, Del., a corporation of Delaware No Drawing. Application September 17, 1942, Serial No. 458,737

8 Claims. (Cl. 260—78.5)

This invention relates to vinyl polymers and to a process for their production. More particularly, it relates to a new and improved process for the production of vinyl halide polymers and copolymers.

The polymerization of vinyl halides, especially vinyl chloride, according to methods already disclosed in the art is a slow, uneconomical process, which cannot be applied efficiently to production on a large scale. Moreover, copolymerization of vinyl chloride with polymerizable compounds possessing different speeds of polymerization frequently results in non-homogeneous products of inferior quality. It has been suggested that the emulsion method, which is by far the most effective, may be improved somewhat under selected operating conditions by the exclusion of oxygen from the system but the relatively minor increase in speed of polymerization thereby produced is only a partial solution to the important problem of accelerating vinyl halide polymerization.

This invention has as its object the provision of a practical and efficient process for the preparation of polymers and copolymers of vinyl halides. Another object is to develop a process for the preparation of such polymers and copolymers that is extremely rapid even at moderate temperatures. Still another object is to provide a process for the polymerization or copolymerization of vinyl halides that may be carried out in a continuous manner. Other objects will be apparent from the following description of the invention.

These objects are accomplished by the following invention which comprises polymerizing a vinyl halide either alone or in admixture with at least one other polymerizable compound, in an aqueous dispersion, the aqueous medium of which contains a dissolved salt of perdisulfuric acid as a polymerization catalyst and an oxidizable sulfoxy compound as a polymerization adjuvant. If the dispersion is to be in the form of an emulsion, a dispersing agent is often desirable. Such dispersing agent is preferably one of the acid-stable types, that is, those having acid-stable solubilizing groups whose activity is unaffected in media of mild acid, e. g. pH 3 to 5, and excludes soaps which are decomposed at this point to the free acids and inorganic salts.

In general, the customary mode of practicing this invention is as follows: An aqueous medium containing about 0.1 to 2.0% of a perdisulfate salt, 0.05 to 0.5% of a polymerization adjuvant as sodium bisulfite, and about 1 to 5% of a dispersing agent as defined above is adjusted to a pH of about 2-4 by the appropriate addition of acids or acid reacting salts. This medium is then placed in a suitable pressure vessel, which is provided with a means of agitation such as shaking or stirring, followed by about one-half its weight of vinyl chloride or mixture of vinyl chloride and at least one other polymerizable compound. The air in the free space of the vessel is displaced by an inert gas such as nitrogen, provided the contents are chilled below the boiling point of vinyl chloride, and the vessel is then closed. It is thereafter heated in a constant temperature bath in the range of 30–50° C. with constant or intermittent agitation until polymerization has proceeded to the desired extent.

The following examples, in which the parts are given by weight, further illustrate the practice of the invention.

EXAMPLE I

The following dispersing solution is prepared:

| | Parts |
|---|---|
| Water | 1600 |
| Commercial dispersing agent containing about 32% active ingredient which consists mainly of the sodium salt of sulfonated paraffin white oil | 96 |
| Ammonium perdisulfate | 4.25 |
| Sodium bisulfite | 1.6 |

The pH of the solution is adjusted to 2.4 using dilute sulfuric acid. One hundred parts of this solution is placed in a suitable glass pressure vessel and cooled below the boiling point of monomeric vinyl chloride. A mixture of 45.3 parts of vinyl chloride and 5 parts of vinyl acetate is introduced into the vessel, the free space of the vessel is flushed out with nitrogen, and the vessel closed.

After the contents of the vessel have been liquefied by warming slightly, the vessel is agitated at 40° C. for a period of two hours. The vessel is again cooled in ice water and opened. The contents are diluted with an equal volume of distilled water, heated to a temperature of approximately 85° C., and the polymer precipitated by the addition with vigorous stirring of 5 parts of 10% aluminum sulfate solution. Heating is continued for a short time and the polymer is then filtered off. It is washed thoroughly with water until substantially all residual catalyst and dispersant are removed. The polymer, after treatment with a 0.5% sodium hydroxide solution, is washed with methanol to facilitate drying. It is then air dried and after drying amounts to 45.2 parts which represents a 90% yield. The snow-white polymer can be hot pressed into very tough, light colored sheets. The properties of the polymer are similar to those of the same type of copolymer prepared by slower methods.

Example II

A mixture of 20 parts of vinyl acetate and 30.2 parts of vinyl chloride is polymerized exactly as in Example I, and isolation of the polymer yields 28.5 parts, corresponding to a yield of 57%. The light colored polymer is readily soluble in dioxan, methyl ethyl ketone, cyclohexanone and ethylene dichloride. It is suitable for use in lacquers, coating compositions and similar application.

Example III

A mixture of 12.5 parts of methyl acrylate and 39.6 parts of vinyl chloride is polymerized and isolated as in Example I. The yield amounts to 49.4 parts, corresponding to a yield of 95%. The copolymer can be molded into tough, light colored articles.

Example IV

A repetition of Example I substituting 5 parts of asymmetrical dichloroethylene and 44.5 parts of vinyl chloride for the monomers there specified gives 42.5 parts (84% yield) of polymer. The product can be hot pressed into very tough light colored sheets.

Example V

When Example IV is repeated using a mixture of 35 parts of asymmetrical dichloroethylene and 16.2 parts of vinyl chloride there is obtained 30.6 parts (60% yield) of copolymer. The product can be hot pressed to practically colorless sheets possessing considerable toughness and elasticity.

Example VI

Repetition of Example 1 using 50.6 parts of vinyl chloride instead of the mixture of vinyl acetate and vinyl chloride there specified, and allowing the polymerization to proceed only one hour yields 43 parts of polyvinyl chloride which corresponds to a yield of 85%. Pressed sheets of the polymer are not as tough as those made from the vinyl chloride copolymers.

If the polymerization is allowed to proceed for two hours instead of only one hour, the yield of polymer is in excess of 98% of theory.

Example VII

A mixture of 150 parts of distilled water and 0.83 part of ammonium perdisulfate is placed in a suitable glass pressure vessel and cooled below the boiling point of monomeric vinyl chloride. To this cold solution is added 0.20 part of sodium bisulfite, 15.8 parts of diethyl fumarate, and 166 parts of vinyl chloride, the free space of the vessel is swept out with nitrogen, and the vessel closed. The vessel is then agitated at 40° C. in a water bath. At the beginning of the heating there are two distinct layers or phases with the monomers constituting the upper layer. After 15 to 20 minutes at 40° C. a slight bluish haze begins to form in the aqueous phase and this haze continues to become whiter and more opaque while increasing in volume at the expense of the monomer layer. After four hours of heating the volume of the monomer layer is less than half of its original value and in 19.5 hours the entire charge is a pasty mass containing some granules but no hard, large lumps. The paste is suspended in water and the polymer isolated as described in Example I. The yield of dry polymer is almost quantitative. It can be hot pressed into tough, stiff, almost colorless sheets. Specimens molded at 160° C. and 2000 lbs./sq. in. pressure have a softening point of 80° C. and an impact strength of 0.64 ft. lbs./inch of notch.

Example VIII

The following dispersing solution is prepared:

| | Parts |
|---|---|
| Distilled water | 10,000 |
| Commercial dispersing agent containing about 32% active ingredient which consists mainly of the sodium salt of sulfonated paraffin white oil | 600 |
| Ammonium perdisulfate | 17 |
| Sodium bisulfite | 8 |

The pH of the solution is adjusted to 2.5 by the appropriate addition of dilute sulfuric acid. This solution is then introduced together with 300 parts of diethyl fumarate into a nickel-lined autoclave fitted with a stirrer and the vessel closed. The free space of the vessel is flushed out with nitrogen and 5000 parts of vinyl chloride is pressed in from storage cylinders. The resulting mixture is then stirred for two hours during which time the temperature rises from 26° C. to 51° C. even though the autoclave is water-cooled. The resulting milky dispersion is removed from the autoclave and the polymer isolated in the same manner described above. The yield of dry polymer amounts to 4950 parts or 93% of theoretical yield. This copolymer can be molded into light colored, tough bars which have a softening point of 79.5° C. and a flexural strength of 13,150 lbs./sq. in. After milling with suitable plasticizers and pigments, the polymer can be calendered into smooth, tough sheets. These calendered sheets may be laminated to fabrics to give a very durable type of artificial leather.

Example IX

A mixture of 625 parts of the dispersing agent described above, 28 parts of ammonium perdisulfate and 10,200 parts of water is brought to a pH of 2.5 by the appropriate addition of dilute sulfuric acid. This solution together with 50 parts of dimethyl fumarate is introduced into a nickel-lined pressure vessel fitted with a stirrer. The free space of the vessel is swept with nitrogen and 4565 parts of vinyl chloride is forced in from storage cylinders. The mixture is then stirred for 45 minutes at 15° C. without any visible signs of reaction. Fifty parts of a 5% sodium bisulfite solution is then added and polymerization begins, accompanied by a slow rise in temperature. Samples of polymer dispersion are withdrawn at intervals for density determinations, and, as necessary, dimethyl fumarate added as a 25% suspension in water. Sodium bisulfite solution likewise is added as required when the rate of polymerization falls off as shown by the density of the polymeric dispersion remaining constant. The rate of addition of ester and bisulfite is adjusted so that polymer dispersion density and the amount of ester and bisulfite solution added have the following relation:

| Polymer Dispersion Density (20° C.), g./cc. | Total Parts of Ester present | Total Parts of 5% Bisulfite solution present |
|---|---|---|
| 1.021 | | |
| 1.029 | 100 | 50 |
| 1.053 | 150 | 75 |
| 1.063 | 225 | 75 |
| 1.076 | 450 | 100 |
| 1.083 | 538 | 100 |
| 1.086 | 625 | 100 |
| 1.087 | 913 | 205 |
| | 940 | 255 |

After all the ester (940 parts) has been added, the mixture is heated with stirring at 40° C. for an addtional two hours, cooled and withdrawn from the autoclave. Isolation of the polymer is carried out as described in Example I. The dry powdery polymer obtained amounts to 4650 parts (85% yield) and contains 83.2% vinyl chloride. The polymer can be molded into tough, light colored bars which soften at 82.5° C. and have a flexural strength of 14,700 lbs./sq. in.

EXAMPLE X

The following dispersing solution is prepared:

| | Parts |
|---|---|
| Water | 200 |
| Dispersing agent described in Example I | 12.5 |
| Ammonium perdisulfate | 0.56 |
| Sodium bisulfite | 0.2 |

The pH of the solution is adjusted to 2.4 using dilute sulfuric acid. The solution is then placed in a suitable pressure vessel and the contents cooled to a temperature below the boiling point of monomeric vinyl chloride. A mixture of 10 parts of dimethyl fumarate, 10.5 parts of vinyl acetate and 78 parts of vinyl chloride is then added in the order named. The free space of the vessel is flushed out with nitrogen and the vessel sealed. It is thereafter heated with agitation at 40° C. for a period of 20 hours although polymerization appeared to be complete after two hours of heating. The copolymer was isolated using the method described above and amounts to 87 parts which corresponds to a yield of 89%. The product was found to contain about 81% vinyl chloride. Specimens of the polymer molded at 160° C. and 2000 lbs./sq. in. have a softening point of 78° C. and an impact strength of 0.63 ft. lbs./inch of notch.

In place of sodium bisulfite, formamidine sulfinic acid may be used with equally effective results.

EXAMPLE XI

A series of polymerization experiments which illustrates the unique and marked acceleration in polymerization rate using the process of this invention is summarized in the table below. The monomer mixture polymerized in all cases consists of 88 parts of vinyl chloride and 12 parts of diethyl fumarate. The catalyst is ammonium perdisulfate, the polymerization adjuvant is sodium bisulfite and the sulfonated paraffin oil described in Example I is used as the dispersant. The aqueous/monomer ratio used is 2/1 in all cases while the amounts of the catalyst, adjuvant and dispersant are varied as indicated in the table below. The polymerization and isolation of the polymer are carried out as described in Example I. The yield of polymer given is based on the dry polymer.

Table

| Run | Per cent Catalyst | Per cent Adjuvant | Per cent Dispersant | Time, hrs. | Yield, Per cent |
|---|---|---|---|---|---|
| 1 | 0 | 0.46 | 0 | 24 | 0 |
| 2 | 0 | 0.46 | 4 | 2 | 1 7 |
| 3 | 0.5 | 0.46 | 0 | 24 | 99 |
| 4 | 0.5 | 0.46 | 4 | 2 | 94 |
| 5 | 0.5 | 0.15 | 4 | 2 | 90 |
| 6 | 0.5 | 0.20 | 4 | 5 | 98 |
| 7 | 0.5 | 0.0 | 4 | 5 | 20 |
| 8 | 0.5 | 0.0 | 0 | 24 | 0 |
| 9 | 0 | 0.0 | 4 | 24 | 0 |

[1] Gummy—very low molecular weight—contains monomer.

The above table clearly illustrates the remarkable acceleration in polymerization rate attained using the process of this invention.

The above examples illustrate the practice of the invention both in the presence and absence of added dispersing agents. They also demonstrate the unusual extremely rapid polymerization of vinyl halides obtained when using the present invention. It should be pointed out the combinations of catalyst-adjuvant employed herein are both unique and superior, as it is not possible to attain such remarkable rapidity of polymerization of vinyl halides by any other means. This marked acceleration of polymerization rate is accomplished without sacrifice of quality of products.

EXAMPLE XII

The following dispersing solution is prepared:

| | Parts |
|---|---|
| Dispersing agent described in Example I | 6 |
| Ammonium perdisulfate | 0.25 |
| Sulfur dioxide | 0.125 |
| Water | 94 |

The pH of the solution is adjusted to 2.1. This solution is then placed in a suitable glass pressure vessel and cooled below the boiling point of monomeric vinyl chloride. Monomeric vinyl chloride (47.6 part) is then introduced into the vessel, the free space of the vessel swept with nitrogen and the vessel closed. The polymerization is then carried out exactly as described in Example I. The yield of polymer amounts to 46.6 parts or 98% of theory.

EXAMPLE XIII

In a nickel-lined autoclave is placed a mixture of 176.8 parts of water, 2.2 parts of trichlorethylene, and 0.44 part each of ammonium persulfate and sodium bisulfite. After sweeping with nitrogen, the autoclave is sealed and 42 parts of vinyl chloride are charged in under pressure. Agitation is begun immediately, and the temperature of the charge is raised gradually to 35° C. by passing water at 45° C. through the autoclave jacket. When the temperature of the reaction mixture reaches 30° C., the jacket temperature is dropped to 30° C. and thereafter controlled so as to maintain the reactor temperature at about 40° C. The pressure within the autoclave gradually increases to 80–100 pounds, and remains there until the reactor temperature reaches a peak of approximately 40° C. Usually about one hour is required for the pressure and temperature to reach peak values. When peak temperature is reached and the reactor temperature begins to fall off, the jacket water is regulated so as to maintain the temperature of the charge at about 40° C. The pressure steadily decreases for about two to three hours, when it reaches a fairly constant value of about 40 pounds. Excess pressure is vented off, and the reaction emulsion is discharged into a suitable container and worked up in the usual manner.

The rate of polymerization (and hence the solubility of the copolymer) may be controlled by suitable variations in the catalyst concentration, the reaction period being inversely proportional to this factor. The concentration of trichlorethylene in the original charge may be varied considerably without affecting the basic process.

EXAMPLE XIV

A continuous polymerization unit for the preparation of polyvinyl chloride is constructed as follows:

A water-jacketed stainless steel reservoir is provided with an inlet tube for charging vinyl chloride, a second inlet for charging the aqueous components of the system, a pressure gauge, and a discharge line from the bottom of the reservoir leading to a high speed centrifugal pump up into the top of the reservoir so that the entire contents of the reservoir can be rapidly circulated and the vinyl chloride kept uniformly mixed with the aqueous phase. Immediately above the discharge side of the pump a line is carried into a stainless steel coil immersed in a water bath maintained at 40° C. This stainless steel coil is provided with suitable connections so that the entire contents of the coil or the first 75% of the contents of the coil can be circulated at high speed through a second centrifugal pump. The end of the coil is closed with a valve. All of this unit which may be exposed to vinyl chloride is constructed of stainless steel. The operation of this unit is as follows.

Into the reservoir is charged:

|  | Parts |
|---|---|
| Vinyl chloride monomer | 5.5 |
| Water | 27.5 |
| Ammonium persulfate | 0.028 |
| Sodium bisulfite | 0.028 |

As soon as the charge is placed in the reservoir, water at 0° C. is circulated through the water jacket, and the centrifugal pump which circulates the mixture in the reservoir is started. A moment later the valve at the end of the coil is opened and the mixture from the reservoir drawn into the coil and the connections of the coil, including the circulating pump, until liquid appears at the valve. At that point the valve is closed and the charge in the reservoir together with the charge in the coil, allowed to circulate for 15 minutes. The valve is then opened slightly, and a water suspension of polyvinyl chloride withdrawn at such a rate that substantially no monomeric vinyl chloride is secured. In order to prevent volatilization of monomer in the stainless steel coil it is necessary to add nitrogen to the reservoir until the total pressure in the reservoir is 180 lbs. per sq. inch. Under these conditions the unit operates satisfactorily and polyvinyl chloride suspension can be withdrawn continuously from the coil with practically complete conversion of the monomer to polymer. In case excessive amounts of monomer appear at the draw-off line it is only necessary to stop circulation of the contents of the last quarter of the stainless steel coil for a few moments and allow this portion of the coil to act as a final polymerization chamber for the vinyl chloride.

EXAMPLE XV

To 6500 parts of water containing 20 parts of sodium lauryl sulfate, 6 parts of ammonium perdisulfate, 6 parts of sodium bisulfite and 15 parts of formic acid is added 200 parts of diethyl fumarate. After emulsifying by shaking and saturating with nitrogen, the mixture is charged into a glass-lined autoclave. After flushing the free space with nitrogen and closing the autoclave, 1800 parts of liquid vinyl chloride is forced into the autoclave by applying nitrogen pressure to the liquid in a connecting reservoir. By means of water of controlled temperature circulating through the autoclave jacket the temperature of the dispersion is maintained at approximately 40° C. until after two hours the fall of the pressure indicates the reaction is essentially complete. The emulsion is withdrawn and freed from a small amount of agglomerated polymer by filtering through a fine cloth. The emulsion is placed in a stainless steel vessel surrounded by Dry Ice and after 24 hours is found to be frozen solid. Upon melting the mass in 30 pounds of water at 50° C. the product settles out as a uniformly granular solid and the water is entirely free from emulsified or otherwise finely dispersed polymer. The product is washed thoroughly and dried. Sheets of this copolymer prepared in the usual manner are of excellent clarity and essentially colorless.

This invention is generic to the polymerization of vinyl halides, especially vinyl chloride and vinyl bromide. Among these compounds vinyl chloride is polymerized most satisfactorily by the process of this invention, and is preferred. As indicated in the foregoing examples the process is also applicable to the polymerization of vinyl halides in the presence of other materials which contain an ethylenic bond capable of vinyl polymerization. This provides an uniquely effective means for obtaining high quality copolymers of vinyl chloride with the following substances: Methyl methacrylate, ethyl methacrylate, butyl methacrylate, octyl methacrylate, 2-nitro-2-methyl propyl methacrylate, methoxyethyl methacrylate, chlorethyl methacrylate, phenyl methacrylate, cyclohexyl methacrylate, and the corresponding esters of acrylic acid, acrylo- and methacrylonitrile, acryl- and methacrylamide or mono-alkyl substitution products thereof; unsaturated ketones such as methyl vinyl ketone, phenyl vinyl ketone and methyl isopropenyl ketone; asymmetrical dihalogen ethylenes such as asymmetrical dichloroethylene; vinyl carboxylates such as vinyl acetate, vinyl chloro acetate, vinyl propionate, vinyl butyrate and vinyl stearate; vinylene-alpha-beta dicarboxylic acids, or their anhydrides or derivatives such as maleic anhydride, fumaric esters, maleic esters, citraconic esters and mesaconic esters; vinyl carbazole; vinyl ethers; mono-olefines and substitution products thereof as styrene, isobutylene, and the like. With regard to copolymerization, this invention is chiefly concerned with mixtures of vinyl chloride and one other operable monomer which contain from about 5 to about 95% of vinyl chloride by weight. It is apparent that the properties of the copolymers will depend largely on the type and amount of the other ingredient to be copolymerized with vinyl chloride. It is within the scope of this invention to polymerize vinyl chloride conjointly with two or more compounds which contain an ethylenic bond capable of vinyl polymerization.

The polymerization catalysts encompassed by this invention include the water-soluble salts of perdisulfuric acid. In addition to the ammonium salt disclosed in the examples, there may also be used the sodium, potassium, lithium, barium, magnesium, and calcium perdisulfates. It is observed that the sulfate ion appears in aqueous solutions of perdisulfates. For this reason, while the water-soluble alkaline earth metal salts are operable, they are not usually used because of their tendency to form a precipitate of the corresponding alkaline earth sulfate. The preferred salts are the ammonium and alkali metal salts. Ammonium perdisulfate is especially suited for economic considerations.

The concentration of perdisulfate salt employed may be varied within wide limits. For instance, amounts of perdisulfates varying from 0.1% to 10% of the quantity of monomer employed are operable. In respect to economy of catalyst, quality of product, and rapidity of polymerization, the preferred proportion of perdisulfate salt lies in the range of 0.1% to 4% based on the total weight of monomers employed.

The polymerization adjuvants operable in the invention are defined as oxidizable oxygen-containing sulfur compounds, which promote extremely rapid polymerization of vinyl halides, when used in combination with a perdisulfate catalyst, in the presence or absence of dispersing agents of the type described heretofore. In addition to the inorganic oxidizable sulfoxy compounds, sodium bisulfite and sulfur dioxide, and the organic oxidizable sulfoxy compound formamidine sulfinic acid as shown in the examples, other oxidizable sulfoxy compounds may be used as an adjuvant, such as, for example: the inorganic oxidizable sulfoxy compounds, sodium hydrosulfite, and sodium thiosulfate, and the organic oxidizable sulfoxy compounds, diethyl sulfite, and para-toluene sulfinic acid. The concentration of the adjuvant employed may be varied within wide limits. For instance, amounts of adjuvants varying from 0.001% to 5% of the quantity of monomer employed are operable. In respect to optimum operating conditions and rapidity of polymerization, the preferred proportion of adjuvant lies in the range of 0.05 to 0.5% based on the weight of monomer. The addition of the adjuvant to the reaction mixture is frequently attended with a marked increase in temperature and care must be taken to remove the excessive heat generated in such cases. The total quantity of adjuvant may be added initially to the reaction mixture or in small proportions during the course of polymerization. The latter method affords a convenient procedure for regulating the amount of heat usually generated by adjuvant addition.

As indicated above, the process of the invention is operable either in the presence or absence of added dispersing agents. In some cases, e. g. vinyl chloride polymerization, it is beneficial to operate in the absence of any added dispersant. Copolymerization reactions involving vinyl halides using the process described herein are preferably carried out in the presence of added dispersing agents.

Surface active agents are frequently divided into four classes depending on which portion of the molecule contains the active group. These four classes are the following: anionic (exemplified by ordinary soaps), cationic (exemplified by cetyl pyridinium bromide), hybrid (exemplified by betaine-type compounds), and non-ionic (exemplified by the products obtained in the reaction of long chain alcohols with ethylene oxide). Any one of these types of dispersing agents may be used in the present invention provided they do not lose their activity under the conditions employed. Alkali metal and ammonium salts of long chain aliphatic carboxylic acids are not suitable because of the ease with which they are decomposed by acids. Suitable agents include: Sodium dodecyl sulfate, sodium cetyl sulfate, sodium myristyl sulfate, sodium stearyl sulfate, sodium oleyl sulfate, sodium acetoxyoctadecane sulfate, the sodium salt of sulfonated isopropyl naphthalene, the sodium salt of sulfonated paraffin white oil, the sodium salt of sulfonated cumar resin, C-cetyl betaine, hydroxypropyl C-cetyl betaine, dodecyl trimethyl ammonium bromide, stearyl trimethyl ammonium bromide, the diethyl cyclohexylamine salt of cetyl sulfuric acid, sodium tetradecane-1-sulfonate, partially saponified polyvinyl acetate, the sodium salt of methacrylic acid/methyl methacrylate copolymer and the like. It will be understood that the dispersants to which reference is made above are commercial materials which, because of the methods used in their manufacture and because of the sources of the starting materials, are usually not produced in high state of purity and may contain minor constituents which influence the effectiveness of the active ingredient. Polymerization systems containing such ancillary ingredients, which are present adventitiously or added deliberately, are recognized as part of this invention. These ingredients, which are useful only when an operable dispersant is also present, may include inorganic salts, long chain primary alcohols, carbohydrate derivatives, polyvinyl alcohol, etc.

Using the rate of polymerization as a criterion, the invention contemplates the use of dispersing agent active ingredients in concentrations of 0.2 to 5% based on the weight of the aqueous medium in which the polymerization and copolymerization of vinyl chloride is brought about. Within this range the preferred concentration will in general depend upon the proportion of monomer present, but is usually from 0.5 to 4%. From the standpoint of economy and to facilitate removing the dispersing agent from the polymerized product, it is customary to use the least amount of dispersing agent necessary to bring about the desired rate of polymerization. It is to be understood that when reference is made to the use of definite percentages of dispersing agents, these values are calculated on the basis of the known active ingredient concentration in the commercial dispersants.

It may also be pointed out that the effectiveness of the dispersing agent, especially if small concentrations are employed, is enhanced by agitation of the mixture. Any method of agitation may be used in producing and maintaining the emulsions. The most commonly employed method of mixing is stirring, preferably in vessels containing suitable baffles. Other methods include shaking, tumbling and the use of turbo-mixers. The dispersing agents operable in this invention are in general useful in forming stable emulsions, which after they are once formed, require little or no agitation thereafter. It has been found, however, that polymerization occurs more rapidly in certain emulsions while they are being agitated. It is, accordingly, preferred to assist the dispersing agent in producing and maintaining the emulsion by mechanical means which may or may not be continuous.

The process of the invention may be carried out in alkaline, acid or neutral media. However, it is preferred to carry out the polymerization in an aqueous medium whose pH may vary from about 1 to about 5 since the range appears to enhance the polymerization of vinyl chloride. It is realized, however, that in copolymerizations, the pH of the aqueous media will be governed to a considerable degree by the nature of the monomer which is conjointly polymerized with vinyl chloride. For example, when vinyl esters of carboxylic acids are employed care must be taken to prevent the hydrolysis of the ester. Since the polymerization, in general, proceeds more slowly in environments of low acidity and since high acidity may cause excessive corrosion of the polymerization vessel, it is preferred to conduct polymerization in aqueous media with pH values of about 2 to about 4. If it is desired to avoid pH changes during the course of the polymerization, suitable buffers may be added to the aqueous medium.

The practice of the invention is not confined to the use of any particular proportion of polymerizable monomer or monomers relative to the amount of aqueous media present. Thus the ratio of the aqueous to the non-aqueous phase may vary between approximately 10:1 and 1:1. In general, it is preferred to employ aqueous/non-aqueous ratios between approximately 4:1 and 1:1 since for a given reaction vessel the time-space yield is greatly reduced by the use of higher ratios. It can further be said that higher aqueous/non-aqeuous ratios generally tend to favor the production of lower molecular weight products. It is also helpful in maintaining an emulsion if the proportion of non-aqueous to aqueous phases is not greater than 1:1.

As is well known, the dependence of the rate of vinyl polymerization upon the temperature is very important, and low temperatures cannot be generally used because the corresponding rate of reaction is impracticably low. The present invention can be operated at any temperature above the freezing point of the aqueous phase which is somewhat below 0° C. to 100° C., preferably between 20° C. and 50° C.

It is realized that the presence of oxygen in the polymerization vessel, while not appearing to have a deleterious effect on the properties of the polymers of this invention, may retard the rate of polymerization in certain cases. In these cases it is, therefore, preferable to displace the air from the polymerization vessel by means of a gas which does not reduce the rate of polymerization. Suitable gases are nitrogen, carbon dioxide, methane and helium. These gases may be passed through the free space of the polymerization vessel until the air has been completely displaced or may be introduced under sufficiently high pressure that the oxygen originally present is so greatly diluted as to have little effect on the rate of polymerization. The deleterious effect of oxygen on the polymerization rate is likewise somewhat alleviated by the use of a polymerization adjuvant according to the present invention.

The process is not limited to any particular apparatus but it is important that the reaction vessel shall be constructed of material which has no effect on the rate of polymerization or on the quality of the products and is not affected by the aqueous medium used in carrying out the polymerization. Suitable vessels may be constructed of stainless steel, nickel, silver, or lead. Vessels equipped with glass or enamel liners may also be used.

The copolymerization procedure generally followed in the present invention involves the addition of the entire amounts of each of the two polymerizable compounds to the aqueous medium followed by subsequent emulsification and polymerization of the aqueous dispersion. It is well known that the polymerization rate of the monomers operable in this invention may vary to a considerable extent, and it may also be found in copolymerizing vinyl chloride with one of the operable monomers, that one of the monomeric materials polymerizes more rapidly than the other, thus giving rise to products which may be characterized by non-homogeneity and other inferior physical properties. These effects are avoided to a great extent by using the invention. However, if additional improvement is desired, the polymerization process may be modified by mixing initially all of the more slowly polymerizing material and a small proportion of the more rapidly polymerizing monomer in the aqueous medium, and thereafter adding small portions of the more rapidly polymerizing monomer at about the rate at which this material is used up. The emulsion process of this invention is also adapted to be carried out in a continuous fashion.

At the conclusion of polymerization the products of this invention may be isolated as finely divided powders by a variety of methods. For example, the dispersion may be sprayed into a heated and/or evacuated chamber whereby the water is removed as vapor and the polymer falls to the bottom of the chamber. The polymer may also be isolated by cooling the dispersion below the freezing point of the aqueous medium or by the addition of a large volume of a lower aliphatic alcohol such as methanol or ethanol. The most satisfactory method consists in adding an appropriate amount of an electrolyte solution to the diluted aqueous dispersion with rapid agitation at a temperature just below the point at which the precipitated particles tend to cohere. This procedure yields a polymer in the form of dense granular particles which are readily filtered and washed. Suitable electrolytes include sodium chloride, sodium sulfate, hydrochloric acid, phosphoric acid, calcium chloride, magnesium sulfate, lead nitrate, lead acetate, stannous chloride, and aluminum sulfate. After precipitation of the polymer it is filtered and washed repeatedly with water to remove traces of electrolyte and dispersing agent which may adhere to the particles. Washing with dilute solutions (0.1 to 1%) of caustic soda or ammonium hydroxide assists in removing the last traces of dispersing agent and at the same time yields polymers of improved heat stability. In order to facilitate low temperature drying of the polymers, it is beneficial to employ a final wash with a lower aliphatic alcohol such as methanol or ethanol. Before precipitation it may be advantageous to add to the dispersion small amounts of heat and light stabilizers such as epichlorohydrin, 1-phenoxy-2, 3-epoxypropane, 1-p-tolyloxy-2, 3-epoxypropane, alpha, alpha-dimethyl glycide and ethyl glycidate; cadmium, copper, lead and manganese salts of oleic, linoleic, stearic, ricinoleic, palmitic, lauric and fatty oil acids generally; eugenol, butyl salicylate and guaiacol; glycine, leucine, alanine, and the n-octyl ester of C-dimethyl glycine; and 4-cyclohexyl morpholine. In general, monocarboxylic acid amides, preferably of the secondary or N-monosubstituted type, having heavy hydrocarbon residues, preferably in the form of long open chains, may be used advantageously as stabilizers. Specific compounds of this type include: N-(2-methyl 3-hydroxypropyl)amide of 10-undecenoic acid, N-isobutylamide of naphthenic acids, N-isobutyl lauramide, N-allyl-amide of 10-undecenoic acid, N-(p-ethoxyphenyl)amide of 10-undecenoic acid, amides of castor oil acids, N-isobutylamide of 10-undecenoic acid, N-isobutylamide of oleic acid, N-isobutylamide of coconut oil acids, and the mixture of N-alkylamides of carbamic acid in which the alkyl groups correspond in size and proportion to those present in the higher alcohols obtained by catalytic hydrogenation of carbon oxides. It may also be of advantage to add small amounts of plasticizers such as dibutyl phthalate, tricresyl phosphate, and dibutyl sebacate.

The products prepared according to the present invention may be used for the preparation of plastics, coatings, films, foils, fibers, and adhesives. For any of these purposes, the polymer may be combined with or prepared in the presence of plasticizers, stabilizers, fillers, pigments, dyes, softeners, natural resins or other synthetic resins.

In event the products are to be used as coating or impregnating agents for porous materials, it is possible to apply the emulsions directly to the material to be coated without the intermediate isolation of the polymer.

As many apparently widely different embodiments of this invention may be made without departing from the spirit and scope thereof, it is to be understood that this invention is not to be limited to the specific embodiments shown and described.

I claim:

1. A process for polymerizing a vinyl halide in an aqueous dispersion which comprises dispersing said halide in an aqueous medium containing from .1% to 10%, based on the amount of monomer present, of a dissolved salt of perdisulfuric acid and sodium bisulfite, in an amount within the range of .001% to 5% of the amount of vinyl halide present, and then maintaining said dispersion at a temperature ranging from 0° C. to 100° C. until polymerization occurs.

2. A process for polymerizing vinyl halides which comprises dispersing a vinyl halide in an aqueous medium containing, based on the amount of monomer present, from about 0.1% to 4% of ammonium perdisulfate and from about 0.05% to .5% of sodium bisulfite, and then maintaining the resulting dispersion at a constant temperature ranging from about 20°–50° C. until the desired polymerization takes place.

3. A polymerization process which comprises dispersing vinyl chloride in an aqueous medium containing, based on the quantity of monomer present, from .1% to 4% of a dissolved salt of perdisulfuric acid and from .05% to 5% of sodium bisulfite, and then maintaining the resulting dispersion at a temperature ranging from about 20° C. to 50° C. until polymerization is effected.

4. A polymerization process which comprises dispersing vinyl chloride in an aqueous medium containing, based on the quantity of monomer present, from .1% to 4% of ammonium persulfate as a polymerization catalyst, and from .05% to 5% of sodium bisulfite as a polymerization adjuvant, and then maintaining the resulting dispersion at a temperature ranging from about 20° to 50° C. until polymerization is effected.

5. A polymerization process which comprises dispersing vinyl chloride in an aqueous medium containing, based on the quantity of monomer present, from .1% to 4% of a dissolved salt of perdisulfuric acid, from .05% to 5% of sodium bisulfite, and a dispersing agent, and then maintaining the resulting dispersion at a temperature ranging from about 20° to 50° C. until polymerization is effected.

6. A process for the production of copolymers of a vinyl halide with another polymerizable unsaturated compound containing a single ethylenic double bond which comprises creating a dispersion of a vinyl halide in admixture with another polymerizable unsaturated compound in an aqueous medium containing from .1% to 10% of the amount of monomer of a dissolved salt of perdisulfuric acid and from .001% to 5%, also based on the quantity of monomer, of sodium bisulfite, and then maintaining said dispersion at a temperature ranging from 0° C. to 100° C. until polymerization occurs.

7. A polymerization process which comprises dispersing vinyl chloride and diethyl fumarate in an aqueous medium containing, based on the quantity of monomer present, from .1% to 4% of ammonium persulfate as a polymerization catalyst, and from .05% to 5% of sodium bisulfite as a polymerization adjuvant, and then maintaining the resulting dispersion at a temperature ranging from about 20° C. to 50° C. until polymerization is effected.

8. A process for obtaining an interpolymer of vinyl chloride with diethyl fumarate which consists in dispersing vinyl chloride and diethyl fumarate in an aqueous medium containing, based on weight of monomer present, about one-half of one per cent of ammonium perdisulfate as a polymerization catalyst and about one-tenth of one per cent of sodium bisulfite as an adjuvant and then maintaining the resulting dispersion at a temperature within the range of from 20° to 50° C. until polymerization is effected.

LOUIS PLAMBECK, JR.

REFERENCES CITED

The following references are of record in the file of this patent:

UNITED STATES PATENTS

| Number | Name | Date |
| --- | --- | --- |
| 2,125,649 | Reppe et al. | Aug. 2, 1938 |
| 2,187,817 | Hopff et al. | Jan. 23, 1940 |
| 2,231,905 | Hanford et al. | Feb. 18, 1941 |
| 2,271,384 | Arnold | Jan. 27, 1942 |
| 2,286,264 | Crawford et al. | June 16, 1942 |
| 2,300,920 | Heuer | Nov. 3, 1942 |
| 2,356,925 | Fryling | Aug. 29, 1944 |